Aug. 13, 1957  E. B. ANDERSON  2,802,352
UNIVERSAL JOINT
Filed April 4, 1955  2 Sheets-Sheet 1
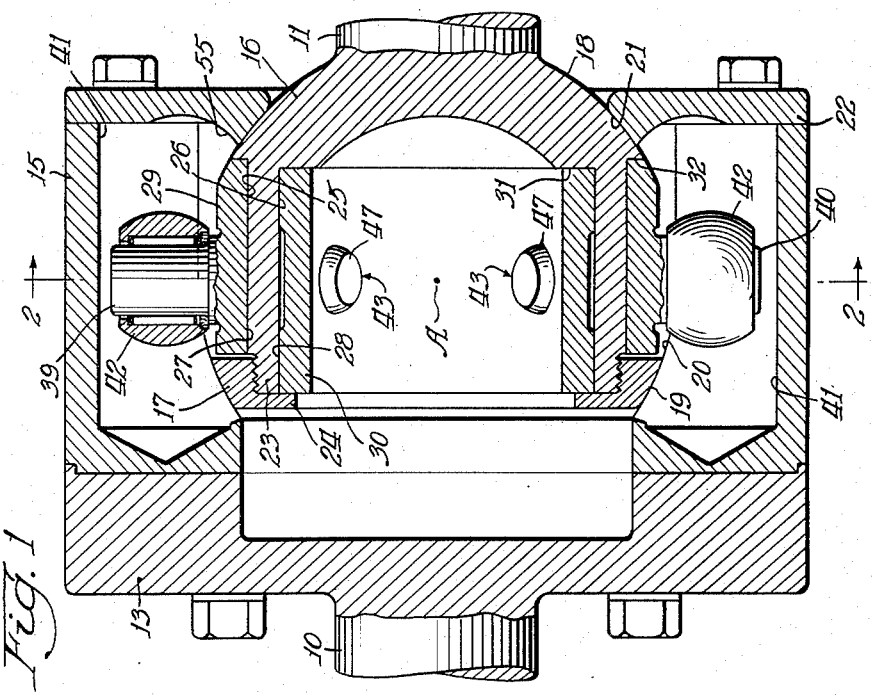
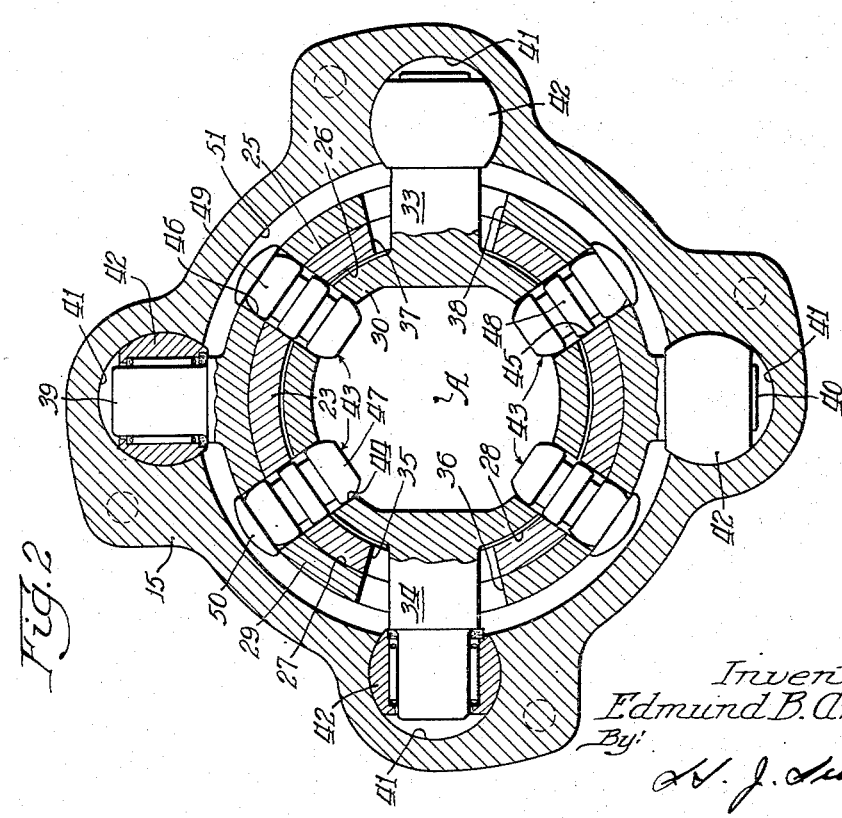
Inventor:
Edmund B. Anderson
By:

Aug. 13, 1957 — E. B. ANDERSON — 2,802,352
UNIVERSAL JOINT
Filed April 4, 1955 — 2 Sheets-Sheet 2
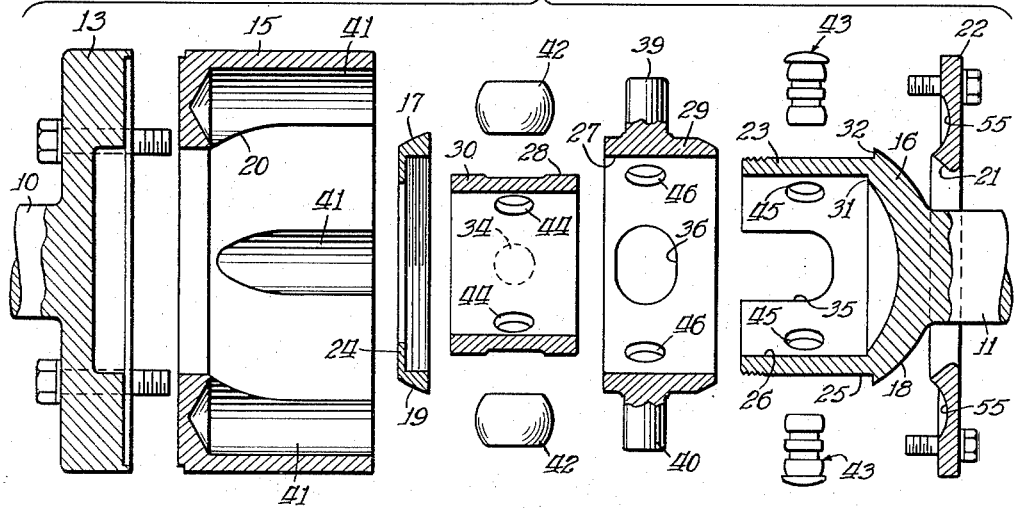
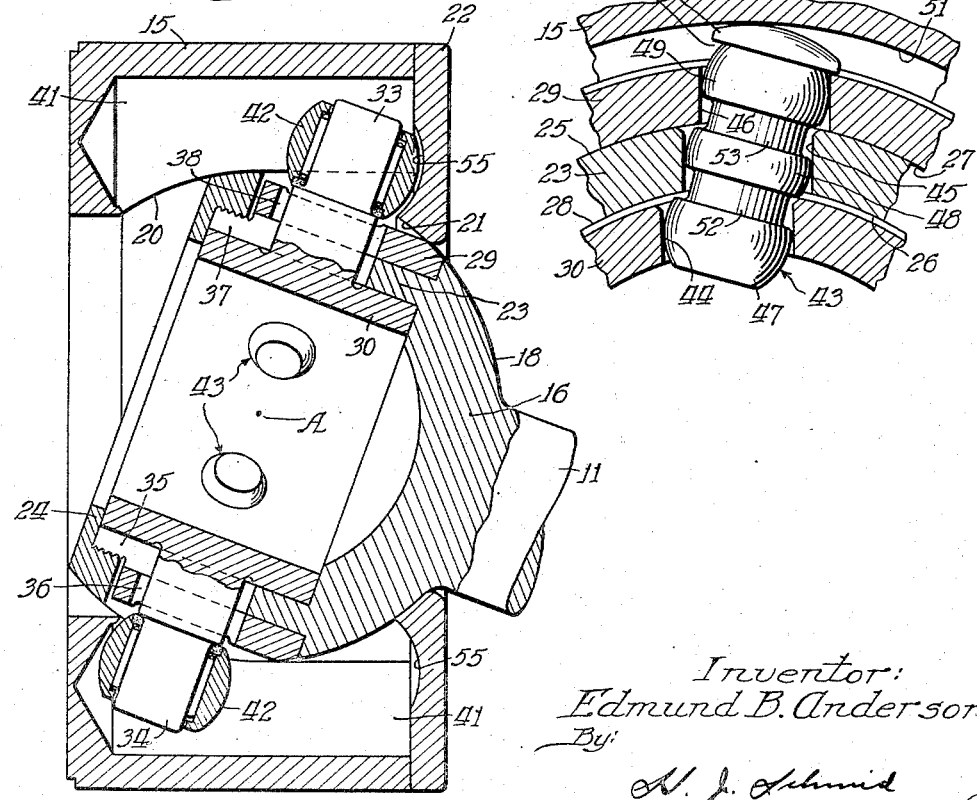
Inventor:
Edmund B. Anderson United States Patent Office 2,802,352
Patented Aug. 13, 1957

2,802,352

UNIVERSAL JOINT

Edmund B. Anderson, Rockford, Ill., assignor to Borg-Warner Corporation, Chicago, Ill., a corporation of Illinois Application April 4, 1955, Serial No. 499,136

7 Claims. (Cl. 64—21)

This invention relates to universal joints and more particularly to a differential compensating type universal joint.

An object of the invention is to provide an improved universal joint of the trunnion type having differential compensating mechanism.

Another object of the invention is to provide an improved universal joint which is simple in construction, may be economically manufactured and durable and positive in operation.

Other objects and advantages of the invention appear in the following description and in the appended claims.

Referring to the drawings:

Fig. 1 is a longitudinal section view of a universal joint embodying the invention, illustrating the position of the parts with the torque-transmitting members in alignment.

Fig. 2 is a cross sectional view taken generally along the line 2—2 of Fig. 1;

Fig. 3 is a view similar to Fig. 1—but illustrating the position of the parts with the torque-transmitting members in angular relation.

Fig. 4 is a fragmentary enlarged view of a portion of the differential compensating mechanism;

Fig. 5 is an exploded view.

Referring to Figs. 1, 2 and 3 illustrating a universal joint assembly, and to Fig. 5 illustrating the component parts of the assembly, embodying the invention, the universal joint comprises rotatable shafts 10 and 11, the shaft 10 having at one end thereof a radially extending flange 13 bolted to a torque transmitting female or socket member 15 and connecting the socket member 15 to the shaft 10, and the shaft 11 having one end thereof provided with a male member defined by a hollow end portion 16, and a ring 17, providing axially spaced concentric spherical surfaces 18 and 19 engaging axially spaced concentric spherical surfaces 20 and 21 of the socket member and a plate 22 bolted to the socket member. The hollow end portion 16 of the male or ball member is provided with a cylindrical portion 23 between and radially inwardly of the spherical surfaces 20 and 21 and having one end in threaded engagement with ring 17 which is provided with a flange 24 engaged with the end of the cylindrical portion 23 to insure the spherical surface 19 of the ring is concentrically located with respect to the spherical surface 18. The engaged spherical surfaces of the male and female members thus prevent relative axial movement of the shafts 10 and 11 while permitting relative angular movement thereof.

The cylindrical portion of the male member 16 is provided with accurately machined radially inner and outer surfaces 25 and 26 engaging complementary surfaces 27 and 28 on radially spaced cylindrical collars or sleeves 29 and 30 disposed in telescoping relation to and engaging the cylindrical portion of the male member, the inner sleeve 30 being held against axial movement relative to the socket member by a shoulder 31 on the socket member and the flange 24 of the ring 17, and the outer sleeve 29 having limited axial movement relative to the socket member between a shoulder 32 on the socket member 16 and the ring 17.

As shown in Figs. 2 and 3, the sleeve 30 is provided with a pair of radially aligned outwardly extending trunnions 33, 34, the trunnion 34 projecting through slots 35 and 36 in the cylindrical portion 23 of the male member and the sleeve 29, the slot 36 being of oval shape, and being greater in length to the circumferential dimension of the slot 35. The trunnion 33 extends through radially aligned slots 37 and 38 in the cylindrical portion 23 of the socket member and sleeve 29 as shown in Figs. 2 and 3, the cylindrical portion 23 having its slots 35 and 37 extending axially and terminating at one end thereof as seen in Figs. 3 and 5, for purposes of assembly with the sleeve 30, and also it may be noted that the slot 36 in the sleeve 29 also extends and terminates at one end of the sleeve to permit the trunnion 33 to be inserted in the sleeve 29.

As seen in Fig. 2, the sides of the slots 35 and 36 and the sides of the slots 37 and 38 are disposed in radial planes converging toward the axis A of the joint to permit movement of the trunnions 34 and 33 about the axis of the joint. Referring to Figs. 2, 3 and 5, the sleeve 29 is provided with outwardly extending trunnions 39 and 40 in radially aligned relation and at right angles to the trunnnions 33 and 34 of the sleeve 30 and lie in a common plane intersecting the axis of rotation of the joint.

The trunnions 33 and 34 of the sleeve 30 and the trunnions 39 and 40 of the sleeve 29 extend within four straight channels or raceways 41 formed in the socket 15 and extend axially of the socket 15 from the open end of the socket, and terminate at the end wall of the socket. The channels 41 of the socket 15 are each formed circular in cross section, as shown in Fig. 2, and engage spherical ball heads, rollers or bearings 42 having bores receiving the trunnions 33, 34 of the sleeve 30 and the trunnions 39 and 40 of the sleeve 29 and rotatable about the trunnions by rollers interposed between the trunnions and the ball heads. It will be apparent the circular curvature of each channel corresponds to the exterior spherical curvature of the ball head 42 received therein.

The universal joint assembly further comprises a differential compensating arrangement to permit the trunnions 33 and 34 of the sleeve 30 to move relative to the trunnions 39 and 40 of the sleeve 29 and register with the raceways 41 in the housing or socket 15 at any point of angularity of the shafts 10 and 11. This differential compensating arrangement is provided by four pins or levers 43, shown in detail in Figs. 2, 4 and 5, and each pin extending through radially aligned circular openings 44, 45 and 46 in the sleeve 30, the cylindrical portion 23 of the male member and the sleeve 29 respectively. The pins are spaced from each other and each is disposed in a radial plane between one of the trunnions on the sleeve 29 and one of the trunnions on the sleeve 30. Each pin is provided with four axially spaced spherical portions 47, 48, 49 and 50, the portion 47 engaging the side of the opening 44 in the sleeve 30, the portion 48 engaging the side of the opening 45 in the cylindrical portion 23 of the male member 16, the portion 49 engaging the side of the opening 46 in the sleeve 29, and the portion 50 comprising a cap having a spherical surface engaging an inner cylindrical surface 51 of the socket member merging at one end with the spherical surface 20 thereof and preventing radial movement of the pins by the engagement of the cap with the exterior cylindrical surface of the sleeve 29 as shown in Fig. 2. The spherical portions 47, 48, 49 and 50 are separated by grooves 52, 53, 54 to allow the edges of the sleeves 29 and 30 and the cylindrical portion of the male member, defining the circular openings 44, 45 and 46, to enter the grooves during oscillation of these parts about the axis of the joint as shown in Figs. 3 and 4 wheerin the shaft 11 is moved to one of its extreme angular positions with respect to the shaft 10 and the ballheads 42 are disposed with an arcuate recess 55 in the plate 22. Each pin rotates about the axis of the spherical surface 48 during angular movement of the shafts 10 and 11 in the operation of the joint.

Considering the movement of the parts of the universal joint in operation, Figs. 1 and 2 illustrate the parts in the position assumed when the shafts 10 and 11 are axially aligned and rotating about a common axis and, in Figs. 3 and 4, during angular relationship of the shafts. It will be noted that the drive may be, for example, from the shaft 10 to the socket 15 to concurrently rotate the sleeves 29 and 30 through their trunnions and rollers disposed in the raceways 41 in the socket. Rotation of the sleeves 29 and 30 causes the pins 43 to compel rotation of the male member 16 and the shaft 11. In any subsequent angularity of the shafts 10 and 11, and assuming, for example, the shafts are at their greatest angular position of approximately 20 degrees as shown in Figs. 3 and 4, the movement of one or the other of the shafts will cause the sleeves 29 and 30 to rotate relative to each other and in opposite directions about the cylindrical portion of the male member 16 by the lever action of the pins, induced in the pins by the movement of the cylindrical portion 23 of the male member, forcing the pins to rotate about the axis of the spherical portions 48 of the pins to move the sleeves 29 and 30. This differential compensating characteristic of the joint insures relative movement of each of the trunnions 33 and 34 on the sleeve 30 and each of the trunnions 39 and 40 on the sleeve 29 and to permit registry with the raceways 41 in the housing or socket member 15 at any degree of angularity of the shafts 10 and 11.

A further feature of the universal joint is that all four trunnions are constantly active in operation, and provide a capacity considerably greater than in conventional cardan type universal joints which only have the strength of two trunnions and wearability of two trunnions.

Although a specific embodiment of the present invention has been described, it will be evident that various changes may be made in the form, number and arrangement of parts within the spirit and scope thereof, as defined in the appended claims.

I claim:

1. In a universal joint assembly, a female torque-transmitting member having a spherical surface and a plurality of axially extending spaced raceways intersecting said surface, said member including a plate at one end thereof having a spherical surface concentric to said first-mentioned surface; a male torque-transmitting member having axially spaced concentric spherical surfaces engaging said spherical surfaces of said female member and having a cylindrical portion between and inwardly of said spaced spherical surfaces thereof, one of said surfaces being defined by a ring fixed to the end of said cylindrical portion; a first cylindrical sleeve surrounding and engaging said cylindrical portion of said male member and having radially aligned trunnions extending outwardly therefrom into certain of said raceways in said female member; a second cylindrical sleeve within and engaging said cylindrical portion of said male member and having radially aligned trunnions extending outwardly therefrom at right angles to said trunnions of said first sleeve and extending through openings in said cylindrical portion of said male member and said first sleeve into other of said raceways in said female member; spherical rollers rotatably mounted on said trunnions of said sleeves and engaging said raceways, the inner of said sleeves being held against movement and the outer of said sleeves having limited movement axially of said cylindrical portion by abutment surfaces at one end of said cylindrical portion; and levers extending through radially aligned openings in said sleeves and the cylindrical portion of said male member and having spaced spherical portions engaging said sleeves and cylindrical portion of said male member, each lever having a head with a spherical surface engaging said female member, said levers being effective to move said sleeves in opposite directions relative to said cylindrical portion of said male member about the aligned axes of said sleeves upon relative movement of said male and female members, said levers being spaced from each other and each being disposed in a radial plane between one of said trunnions of said first sleeve and one of said trunnions of said second sleeve.

2. In a universal joint assembly, a female torque-transmitting member having a spherical surface and a plurality of axially extending spaced raceways intersecting said surface, said member including a plate at one end thereof having a spherical surface concentric to said first-mentioned surface; a male torque-transmitting member having axially spaced concentric spherical surfaces engaging said spherical surfaces of said female member and having a cylindrical portion between and inwardly of said spaced spherical surfaces thereof, one of said surfaces being defined by a ring fixed to the end of said cylindrical portion; a first cylindrical sleeve surrounding and engaging said cylindrical portion of said male member and having radially aligned trunnions extending outwardly therefrom into certain of said raceways in said female member; a second cylindrical sleeve within and engaging said cylindrical portion of said male member and having radially aligned trunnions extending outwardly therefrom at right angles to said trunnions of said first sleeve and extending through openings in said cylindrical portion of said male member and said first sleeve into other of said raceways in said female member; spherical rollers rotatably mounted on said trunnions of said sleeves and engaging said raceways, said sleeves being held against movement axially of said cylindrical portion by abutment surfaces at one end of said cylindrical portion and by said ring at the other end of said cylindrical portion; and levers extending through radially aligned openings in said sleeves and the cylindrical portion of said male member and having spaced spherical portions engaging said sleeves and cylindrical portion of said male member, said levers being effective to move said sleeves in opposite directions relative to said cylindrical portion of said male member about the aligned axes of said sleeves upon relative movement of said male and female members.

3. In a universal joint assembly, a female torque-transmitting member having spaced concentric spherical surfaces and a plurality of axially extending spaced raceways between and intersecting one of said surfaces, a male torque-transmitting member having spaced concentric spherical surfaces engaging said spherical surfaces of said female member and having a cylindrical portion between and inwardly of said spaced spherical surfaces thereof; a first cylindrical sleeve surrounding and engaging said cylindrical portion of said male member and having trunnions extending into certain of said raceways in said female member; a second cylindrical sleeve within and engaging said cylindrical portion of said male member and having trunnions extending outwardly therefrom through openings in said cylindrical portion of said male member and said first sleeve into other of said raceways in said female member; rollers rotatably mounted on said trunnions of said sleeves and engaging said raceways; and levers extending through radially aligned openings in said sleeves and the cylindrical portion of said male member and having spaced spherical portions engaging said sleeves and cylindrical portion of said male member, said levers being effective to move said sleeves in opposite directions relative to said cylindrical portion of said male member about the aligned axes of said sleeves upon relative movement of said male and female members.

4. In a universal joint assembly, a female torque-transmitting member having spaced concentric spherical surfaces and a plurality of axially extending spaced raceways between and intersecting one of said surfaces; a male torque-transmitting member having axially spaced concentric spherical surfaces engaging said spherical surfaces of said female member and having a cylindrical portion between and inwardly of said spaced spherical surfaces thereof, one of said surfaces being defined by a ring fixed to the end of said cylindrical portion; cylindrical elements in telescoping relation to said cylindrical portion of said male member and having radially spaced trunnions extending into said raceways in said female member; spherical rollers rotatably mounted on said trunnions of said elements and engaging said raceways, said elements being held against movement axially of said cylindrical portion by abutment surfaces at one end of said cylindrical portion and by said ring at the other end of said cylindrical portion; and levers extending through radially aligned openings in said sleeves and the cylindrical portion of said male member and having spaced spherical portions engaging said sleeves and cylindrical portion of said member.

5. In a universal joint assembly, a female torque-transmitting member having spaced concentric spherical surfaces and a plurality of axially extending spaced raceways between and intersecting one of said surfaces; a male torque-transmitting member having axially spaced concentric spherical surfaces engaging said spherical surfaces of said female member and having a cylindrical portion between and inwardly of said spaced spherical surfaces thereof; a pair of cylindrical elements in telescoping relation to said cylindrical portion of said male member and having bearing portions extending into said raceways in said female member; and levers extending through radially aligned openings in said cylindrical elements and the cylindrical portion of said male member and having spaced spherical portions engaging said cylindrical elements and cylindrical portion of said male member, said levers being effective to move said cylindrical elements in opposite directions relative to said cylindrical portion of said male member about the aligned axes of said cylindrical elements upon relative movement of said male and female members.

6. In a universal joint assembly, a female torque-transmitting member having spaced concentric spherical surfaces and a plurality of axially extending spaced raceways between and intersecting one of said surfaces; a male torque-transmitting member having axially spaced concentric spherical surfaces engaging said spherical surfaces of said female member and having a cylindrical portion between and inwardly of said spaced spherical surfaces thereof, a pair of annular elements in telescoping relation to said cylindrical portion of said male member and having bearing portions extending into said raceways in said female member; and levers extending through radially aligned openings in said annular elements and the cylindrical portion of said male member and engaging said annular elements and cylindrical portion of said male member, said levers being effective to move said annular elements in opposite directions relative to said cylindrical portion of said male member about the aligned axes of said annular elements upon relative movement of said male and female members.

7. In a universal joint assembly, a cylindrical female torque-transmitting member having spaced concentric spherical surfaces and a plurality of axially extending spaced raceways between and intersecting one of said surfaces; a male torque-transmitting member having axially spaced concentric spherical surfaces engaging said spherical surfaces of said female member and having an annular portion between and inwardly of said spaced spherical surfaces thereof; a pair of compensating rings in telescoping relation to said annular portion of said male member and rotatable about the axis of said annular portion of said male member and having bearings extending into and engaging said raceways in said female member; and levers extending through openings in said rings and the annular portion of said male member and engaging said rings and annular portion of said male member.

References Cited in the file of this patent
UNITED STATES PATENTS

| 2,235,002 | Anderson | Mar. 18, 1941 |
| 2,672,740 | Dunn | Mar. 23, 1954 |
| 2,691,876 | Wildhaber | Oct. 19, 1954 |